(12) United States Patent
Arregoces et al.

(10) Patent No.: US 7,558,261 B2
(45) Date of Patent: Jul. 7, 2009

(54) ARCHITECTURE AND METHOD FOR ACCESSING SERVICES IN A DATA CENTER

(75) Inventors: Mauricio Arregoces, Rancho Palos Verdes, CA (US); Maurizio Portolani, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 641 days.

(21) Appl. No.: 11/133,799

(22) Filed: May 21, 2005

(65) Prior Publication Data
US 2006/0106922 A1 May 18, 2006

Related U.S. Application Data

(60) Provisional application No. 60/623,810, filed on Oct. 28, 2004.

(51) Int. Cl.
*H04L 12/28* (2006.01)
(52) U.S. Cl. .............. 370/389; 370/469; 709/220; 709/223
(58) Field of Classification Search .......... 370/389, 370/469; 709/220, 223
See application file for complete search history.

(56) References Cited

U.S. PATENT DOCUMENTS

| | | | |
|---|---|---|---|
| 6,870,813 B1 * | 3/2005 | Raza et al. ............ | 370/238 |
| 2002/0073337 A1 * | 6/2002 | Ioele et al. ............ | 713/201 |
| 2003/0112582 A1 * | 6/2003 | Sanders et al. ........ | 361/600 |
| 2003/0140131 A1 * | 7/2003 | Chandrashekhar et al. .. | 709/223 |
| 2005/0047098 A1 * | 3/2005 | Garnett et al. ........ | 361/735 |
| 2006/0013231 A1 * | 1/2006 | Matthews et al. ...... | 370/395.53 |

OTHER PUBLICATIONS

Cisco Systems, Inc., "Data Center Networking: Integrating Security, Load Balancing, and SSL Services Using Service Modules", Copyright © 2003, 107 pages.

* cited by examiner

*Primary Examiner*—Ricky Ngo
*Assistant Examiner*—Luat Phung
(74) *Attorney, Agent, or Firm*—Trellis IP Law Group, PC

(57) ABSTRACT

An architecture, arrangement, system, and method for providing service access in a data center are disclosed. In one embodiment, an arrangement can include: an aggregation switch configured to transfer data between a network and an access layer; and service modules coupled to the aggregation switch, where each service module is configured to provide a service for the data when selected. The service modules can include: firewall, load balancer, secure sockets layer (SSL) offloader, intrusion detection system (IDS), and cache, for example. Further, the service selection can be substantially transparent to an associated server.

18 Claims, 4 Drawing Sheets

ARCHITECTURE AND METHOD FOR ACCESSING SERVICES IN A DATA CENTER

RELATED APPLICATIONS

This application claims the benefit of U.S. Provisional Application No. 60/623,810, filed Oct. 28, 2004, which is incorporated herein by reference in its entirety.

BACKGROUND AND SUMMARY OF THE INVENTION

Embodiments of this invention relate in general to data management systems. More specifically, embodiments of this invention relate to architectures, arrangements, systems, and/or methods for providing service access in a data center.

In modern data centers, such as server farms made of thousands of server ports, a common problem is determining a suitable approach to providing shared security and/or server scalability. For example, not all of the ports in the server farm will require both load balancing and security services. In typical systems, some ports will require these services and some will not. One approach is to designate or provide some services to some ports and restrict other services to other ports. A drawback of this approach, however, is that each server is not allowed service flexibility for associated data. Further, system performance may be limited when data requiring a particular service exceeds the available resources. Also, such an approach is not ideal for scaling because of the particularized requirements of each additional port which typically increases configuration management and complexity.

Accordingly, it would be desirable to have an improved architecture, arrangement, system, and/or method for providing service access in a data center. Such an improved approach would allow for increased scalability and flexibility. Service access in the data center may include a number of functions aimed at handling traffic to and from the server farm by manipulating information at any of the network layers of a conversation between client-server, server-server and server to storage, and the manner in which these services are placed logically in reference to the server farm.

In one aspect of the present invention, an arrangement can include: an aggregation switch configured to transfer data between a network and an access layer; and service modules coupled to the aggregation switch, where each service module is configured to provide a service for the data when selected. The service modules can include: firewall, load balancer, secure sockets layer (SSL) offloader, intrusion detection system (IDS), and file or static content cache, for example. Further, the service selection can be substantially transparent to an associated server.

The foregoing and additional features and advantages of this invention will become apparent from the detailed description and review of the associated figures that follow.

DETAILED DESCRIPTION OF EMBODIMENTS OF THE INVENTION

Figure 1:
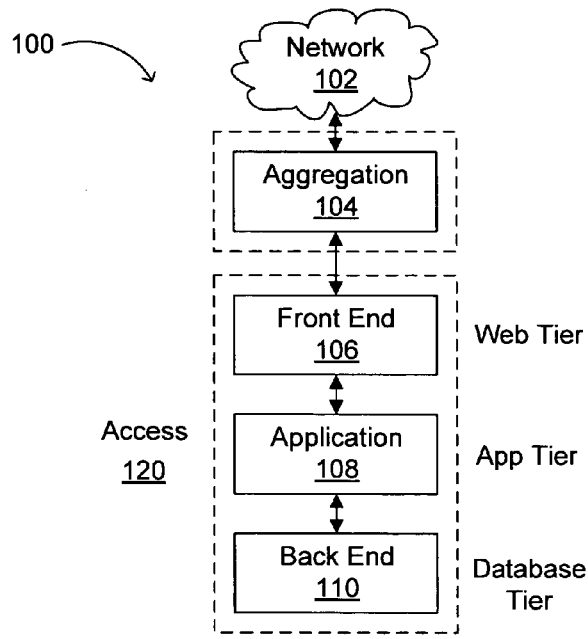
FIG. 1 is a block diagram of an exemplary system arrangement in accordance with an embodiment of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other electronic device, systems, assemblies, methods, components, parts, and/or the like. In other instances, well-known structures, materials, or operations are not specifically shown or described in detail to avoid obscuring aspects of embodiments of the present invention.

Various embodiments of the invention provide an architecture, arrangement, system, and method for service access in a data center. In one embodiment, an arrangement can include: an aggregation switch configured to transfer data between a network and an access layer; and service modules coupled to the aggregation switch, where each service module is configured to provide a service for the data when selected. The service modules can include: firewall, load balancer, secure sockets layer (SSL) offloader, intrusion detection system (IDS), and cache, for example. Further, the service selection can be substantially transparent to an associated server.

In another embodiment of the present invention, a data center system can include a first service layer switch coupled to first and second aggregation switches, and a second service layer switch coupled to first and second aggregation switches. The service switches can offer an alternate physical and/or logical location to data center services. The service layer location may offer substantially higher scalability and point of concentration for data center services.

In another embodiment of the present invention, a data center system can include: a first core switch coupled to first and second scalable modules; and a second core switch coupled to the first core switch and the first and second scalable modules. The first and second scalable modules can each include aggregation switches coupled to access switches, for example.

In yet another embodiment, a method for controlling a service selection for a data packet can include: (i) receiving a data packet in an aggregation layer; (ii) determining whether a service for the data packet is requested and accessing that service when requested; and (iii) directing the data packet to an appropriate server. The administrator of the services set may opt to enforce a particular type of service upon all packets in some particular applications.

In accordance with embodiments of the present invention, an aggregation layer can be utilized in the data center. Such an aggregation layer can effectively: (i) aggregate traffic to the server farm; (ii) aggregate from the server farm to the rest of the network (e.g., from the access layer); and (iii) create points to provide services (e.g., layer 4 and/or layer 7 type of services) based on which application servers may need them. For example, a load balancing service may be provided for some servers, while a firewall can be protecting the same and/or other servers in the data center. Other servers may not use load balancing or firewall services at all. In general, the addition of a suitable aggregation layer in accordance with embodiments can solve conventional problems of adapting specific services for each server.

Referring now to FIG. 1, a block diagram of an exemplary system arrangement in accordance with an embodiment of the invention is shown and indicated by the general reference character 100. Network 102 can be any type of network, including a public network like the Internet, or a private network, such as a Virtual Private Network (VPN). Aggregation 104 can be an aggregation layer configured to adapt specific services for each server, as discussed above. Front end 106 can be an access layer that can include web servers in a web tier, for example. Application 108 can include application servers in an application (app) tier, and back end 110 can include database servers in a database tier, for example. These three tiers may all be considered as part of an access layer (e.g., access 120) coupled to the aggregation layer switches (e.g., aggregation 104).

Figure 2:
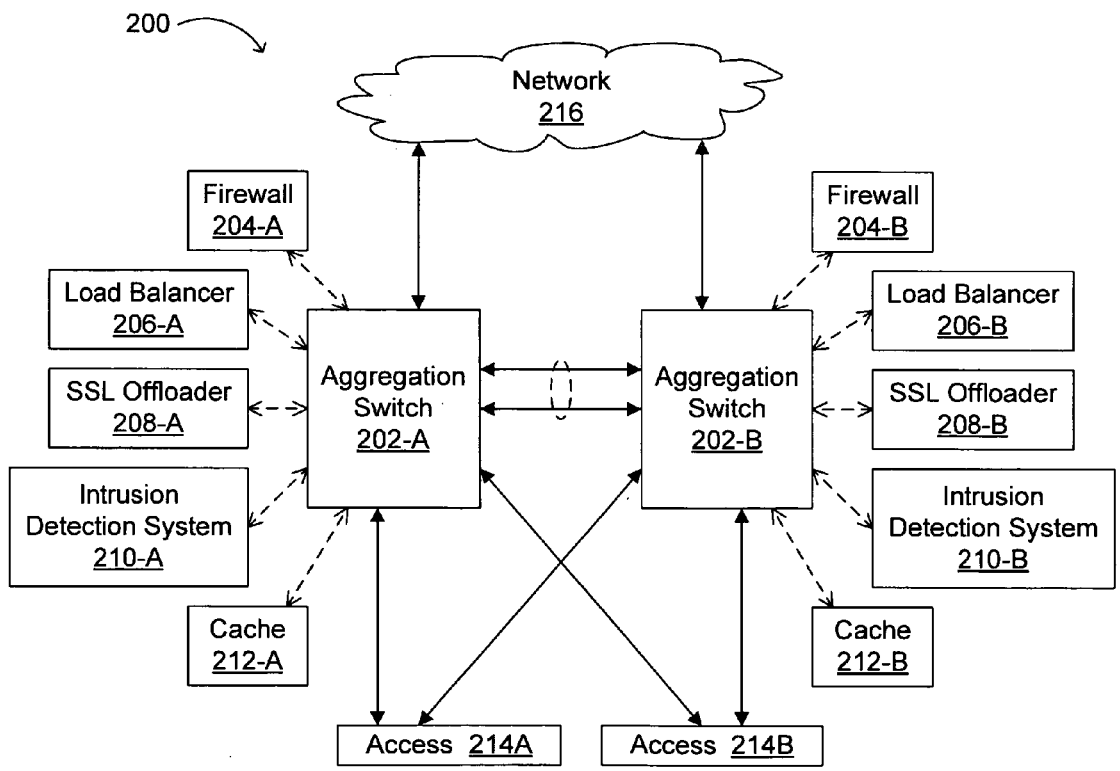
FIG. 2 is a block diagram of an exemplary arrangement of an aggregation layer in accordance with an embodiment of the invention.

Referring now to FIG. 2, a block diagram of an exemplary arrangement of an aggregation layer in accordance with an embodiment of the invention is shown and indicated by the general reference character 200. Such an aggregation layer may be used to aggregate multiple groups of servers, such as in a server farm application. For example, a server farm may include several hundred servers (e.g., in a structure of 6 access switches, 240 servers per switch). According to embodiments, such an aggregation layer may allow communication between these rows with each other as well as with the outside world (e.g., via Network 216, which may be the Internet or a VPN, for example).

In the exemplary arrangement of FIG. 2, aggregation switch 202-A can interface with service modules firewall 204-A, load balancer 206-A, secure sockets layer (SSL) offloader 208-A, intrusion detection system (IDS) 210-A, and cache 212-A. Similarly, aggregation switch 202-B can interface with service modules firewall 204-B, load balancer 206-B, SSL offloader 208-B, IDS 210-B, and cache 212-B. Of course, other service modules and/or more or fewer service modules may interface with aggregation switches 202-A and 202-B. One skilled in the art will recognize that service modules may provide many other types of functions such as traffic monitoring, denial of service protection, message translation, application firewalls and the invention is not necessarily limited to the service module functions described herein. Further, aggregation switches 202-A and 202-B can interface with each other as well as to different components (not shown) in front end and/or access layers 214A and 214B. Service modules interfacing with aggregation switch 202-B may provide a backup or a level of redundancy for those same functions offered through the same type of service modules interfacing with aggregation switch 202-A.

In a typical campus environment, a distribution layer may be the effective functionality, in which case aggregation layer 200 only aggregates data traffic. However, in a typical server farm environment, aggregation layer 200 may perform: (i) aggregation of the traffic; (ii) aggregation of basic server farm networking services such as routing to the overall network, default gateway services and layer 2 connectivity for the server farm; and (iii) aggregation of the data center services (e.g., firewall, load balancing, SSL offloading, intrusion detection, caching). In some implementations, layer 4 and/or layer 7(e.g., in TCP/IP and OSI reference models) services may be provided. Further, the application layer (e.g., layer 7 in the OSI reference model or another model having application layer functions) services and functions may include a firewall that performs inspection and providing a termination point for TCP, which can allow the service module to look at higher level information. Other such services and functions can be packet inspection at layer 4 and higher, load balancing based on the URI, termination of SSL (e.g., decrypt SSL, look inside the packet, perform inspection with an IDS device, and then transfer the packet to the server). These types of services are typically deployed in the vicinity of the server farm in a shared architecture so that the capability is generally available to all servers while conserving centralized service management service predictability. Of course, embodiments of the present invention could be adapted to any appropriate set of services, such as layers 4 and above in the OSI reference model, or another protocol and/or reference model, such as a model that does not have 7 layers.

Figure 3:
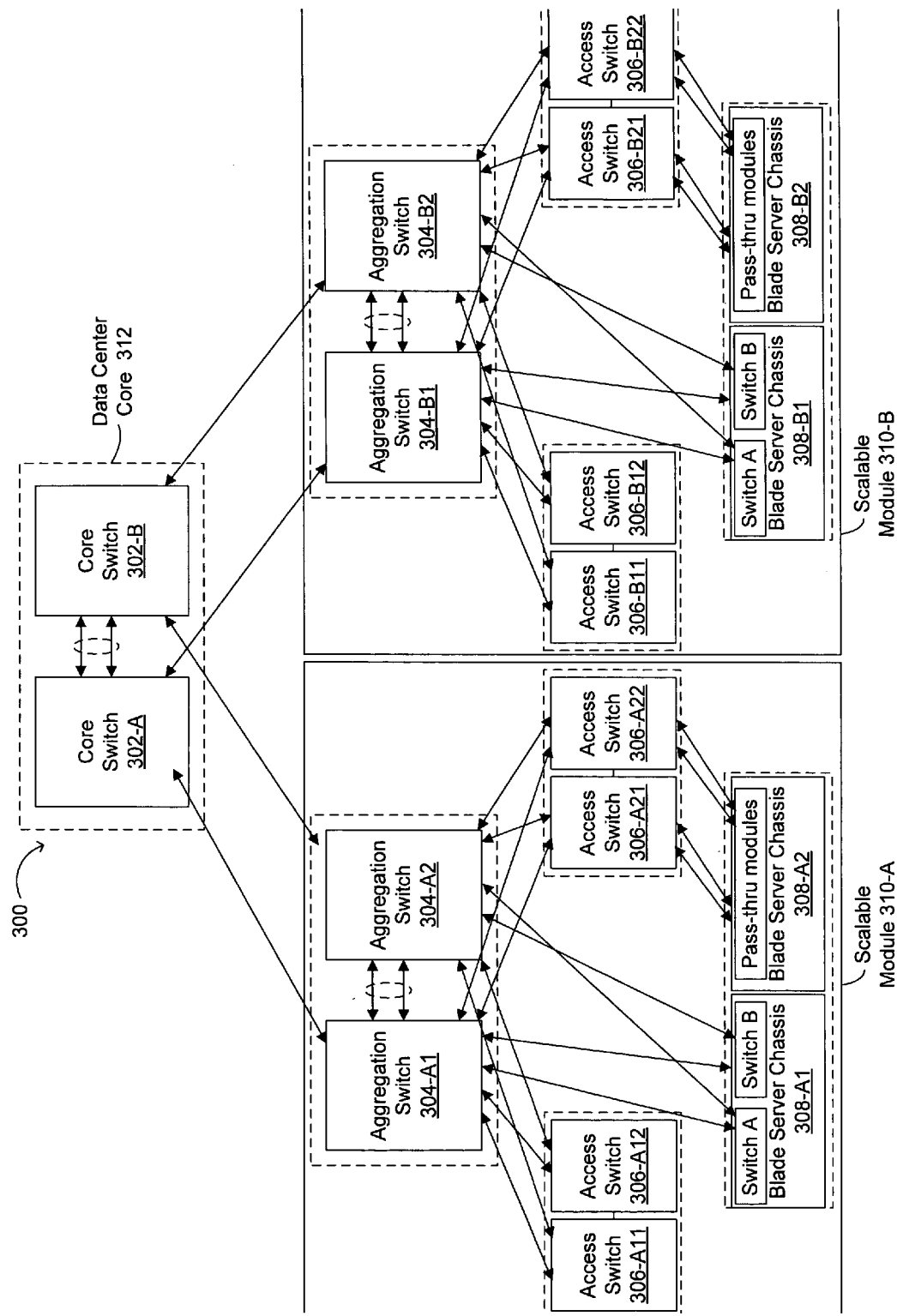
FIG. 3 is a block diagram of an exemplary arrangement of service and aggregation layers within a data center in accordance with an embodiment of the invention.

In an alternative embodiment of the present invention, service switches could be added to the aggregation layer arrangement shown in FIG. 2. Referring now to FIG. 3, a block diagram of an exemplary arrangement of service and aggregation layers within a data center in accordance with an embodiment of the invention is shown and indicated by the general reference character 300. Service switches may be coupled to the aggregation switches (e.g., 302-A and 302-B). The associated service modules may be placed in the service switches. Accordingly, service switch 322-A can couple to aggregation switch 302-A and service modules firewall 304-A, load balancer 306-A, SSL offloader 308-A, IDS 310-A, and cache 312-A. Similarly, service switch 322-B can couple to aggregation switch 302-B and service modules firewall 304-B, load balancer 306-B, SSL offloader 308-B, IDS 310-B, and cache 312-B. Accordingly, the service switches can connect to the different services (e.g., via the service modules) to allow for improved system scaling. Also, service switches 322-A and 322-B may be substantially the same type of switch as corresponding aggregation switches 302-A and 302-B. In one exemplary operation, traffic (e.g., in the form of data packets) may come into an aggregation switch (e.g., 302-A or 302-B), the traffic may get farmed out to one of multiple service switches (e.g., 322-A or 322-B), the traffic may then return from the service switches, and then the traffic may be passed out to an associated server farm through the access layer switches (e.g., 314-A and 314-B).

Accordingly, aggregation layer devices (e.g., including aggregation switches 302-A and 302-B) that may provide services via service layer (e.g., service modules including service switches 322-A and 322-B) can effectively solve scaling problems with having to break out the model of the system due to system area constraints (e.g., in terms of available slots). Slots and/or connectivity options may be gained back by having the service switches. More slots may thus be available to connect access layer switches, so the more slots that are made available in this manner can allow for more servers because service modules are substantially located outside of the aggregation switches. As a result, by using service switches in addition to the aggregation switches in accordance with embodiments, the overall architecture can be made more flexible in service deployments and scalable both higher service functions and larger server farm density.

In one exemplary application, a system may have 1,000-10,000 servers in a facility and that facility may be organized as rows, each row containing multiple racks, based on the type of servers and their power, cooling and/or cabling needs. The server density per row is based on the server density per rack. The servers can include web servers that typically take advantage of load balancing type of functionality as well as other types of servers that may not require any load balancing. According to embodiments, such disparate servers may still all be connected and/or aggregated together to essentially allow aggregation of different traffic from different server types. For example, traffic that is coming in from web servers may be sent to a load balancer. So, if traffic arrives from the network, the traffic can be replicated to the IDS system as it is forwarded to an associated web server. Accordingly, traffic destined for the web server may be processed by a firewall device and/or a load balancer, for example. If traffic is going from the web server to an application or database server, and services are required, such services could be concurrently applied to that traffic as well. But if no special processing is necessary, and all that may be needed is typical switch/routing, it can be done by the same infrastructure, but without using the available load balancer, firewall, or other coupled service modules. Further, the access of services can be substantially transparent to an associated server so that the upstream switch capability is essentially invisible to the server when the router is configured, for example.

Among the design considerations encountered, it was found to be desirable to essentially decouple two problems: (i) port or server density; and (ii) services scalability for any of the various services described (e.g., security and load balancing services). This is because the infrastructure is built in accordance with embodiments with an access and an aggregation layer based substantially on the port count, so a designer knows how many access switches may be required based on the number of servers (e.g., 4,000 servers). Two aggregation switches may then be included per structure, as compared to a conventional approach that may include a different type of switch for each server. Essentially, embodiments of the present invention can provide a more generic front end architecture that can apply to other system configurations. Also by selecting a point in the infrastructure to add services as requested without affecting the slot density makes is possible to add more service devices without having to reduce the number of servers.

Figure 4:
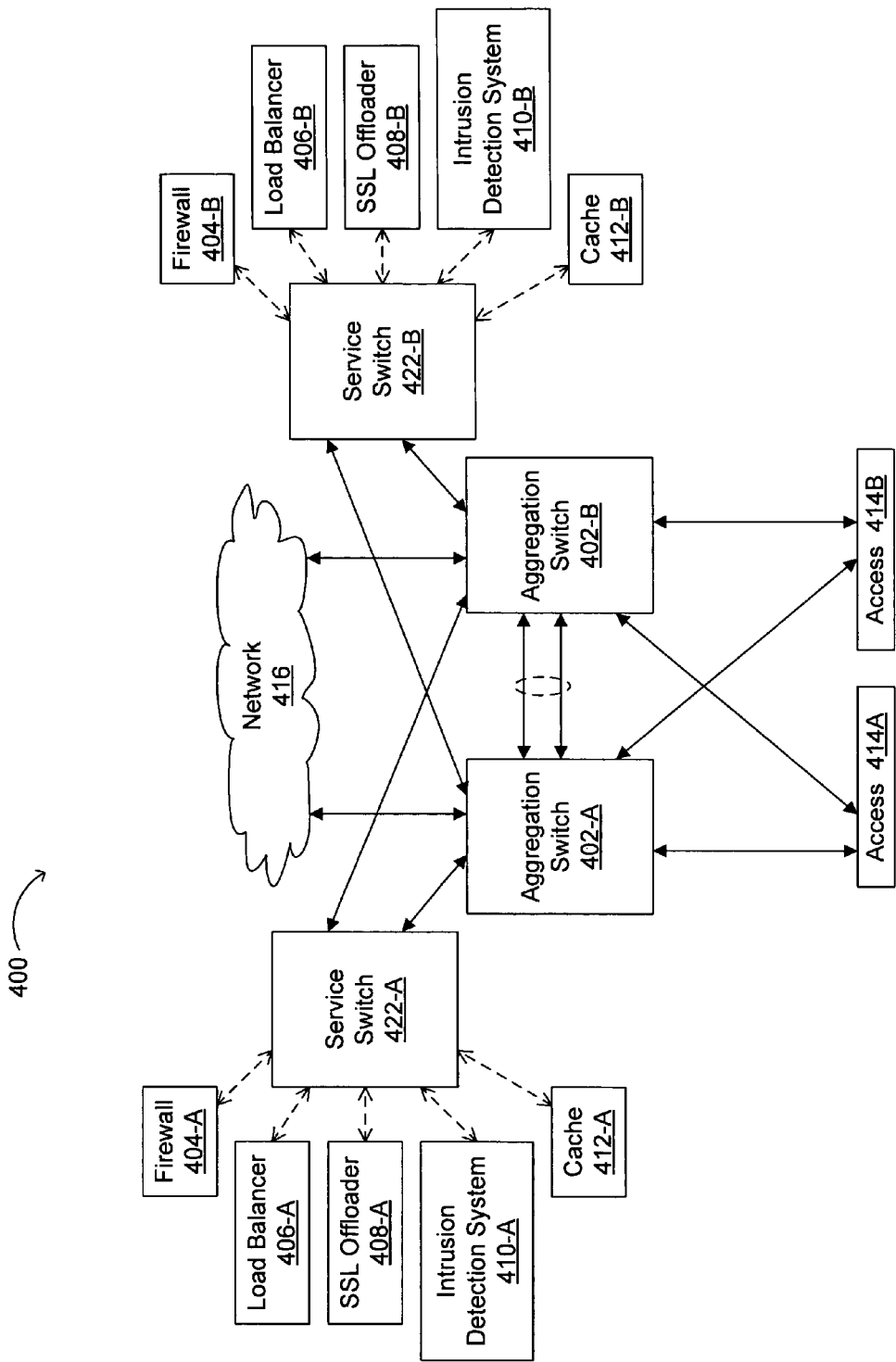
FIG. 4 is a block diagram of an exemplary arrangement of a core layer within a data center in accordance with an embodiment of the invention.

Referring now to FIG. 4, a block diagram of an exemplary arrangement of a core layer within a data center in accordance with an embodiment of the invention is shown and indicated by the general reference character 400. Data center core 412 can include core switches 402-A and 402-B, which can each interface with scalable modules 410-A and 410-B. Scalable module 410-A can include aggregation switches 404-A1 and 404-A2, access switches 406-A11, 406-A12, 406-A21, and 406-A22, and blade server chassis 408-A1 and 408-A2. Similarly, scalable module 410-B can include aggregation switches 404-B1 and 404-B2, access switches 406-B11, 406-B12, 406-B21, and 406-B22, and blade server chasses 408-B1 and 408-B2.

In a core distribution system in accordance with embodiments, a data center core can be expanded from 5,000 servers to 10,000 servers easily by adding a separate module, as shown in FIG. 4. For example, each of scalable module 410-A and 410-B can include about 5,000 servers. Aggregation switches in each of the scalable modules can be connected to data center core switches (e.g., core switches 402-A and 402-B). Data center core switches 402-A and 402-B may be layer 3 type switches that can connect to other switches, such as aggregation switches 404-A1, 404-A2, 404-B1, and 404-B2, that then connect to the Internet in some applications. In other applications, such as an intranet server farm, the aggregation switches may instead go through campus core switches, for example. In various applications, design tradeoffs between capacity and performance can be made, such as how many scalable modules are used in a particular application. For example, scalable module 410-A could be one room or floor and scalable module 410-B could be another room or floor in a campus or intranet environment.

As one connectivity option, a blade server chassis (e.g., 408-A1 and 408-B1) may provide an access layer through integrated switches (e.g., switches 422-A1, 422-A2, 422-B1, and 422-B2). Alternatively, blade server chassis (e.g., 408-A2 and 408-B2) connections may be made directly to an access layer through pass-through links (e.g., modules 424-A and 424-B).

Several possible scaling connections between data center core switches and aggregation layer switches can be made in accordance with embodiments. Possibilities include: (i) channel connections versus non-channel connections; (ii) equal cost layer 3paths; and (iii) full mesh.

In accordance with embodiments, connection to the outside world (whether campus or Internet connection) can be made to an aggregation layer. The aggregation layer can include one or two switches (e.g., an aggregation switch and a service switch) with one switch adaptable to process traffic based on layer 4 and above (e.g., layer 4 and layer 7) information in a substantially transparent manner before directing traffic to a server farm. In general, the architecture is scalable by adding additional switches, service switches in combination with aggregation switches, and/or scalable modules.

Figure 5:
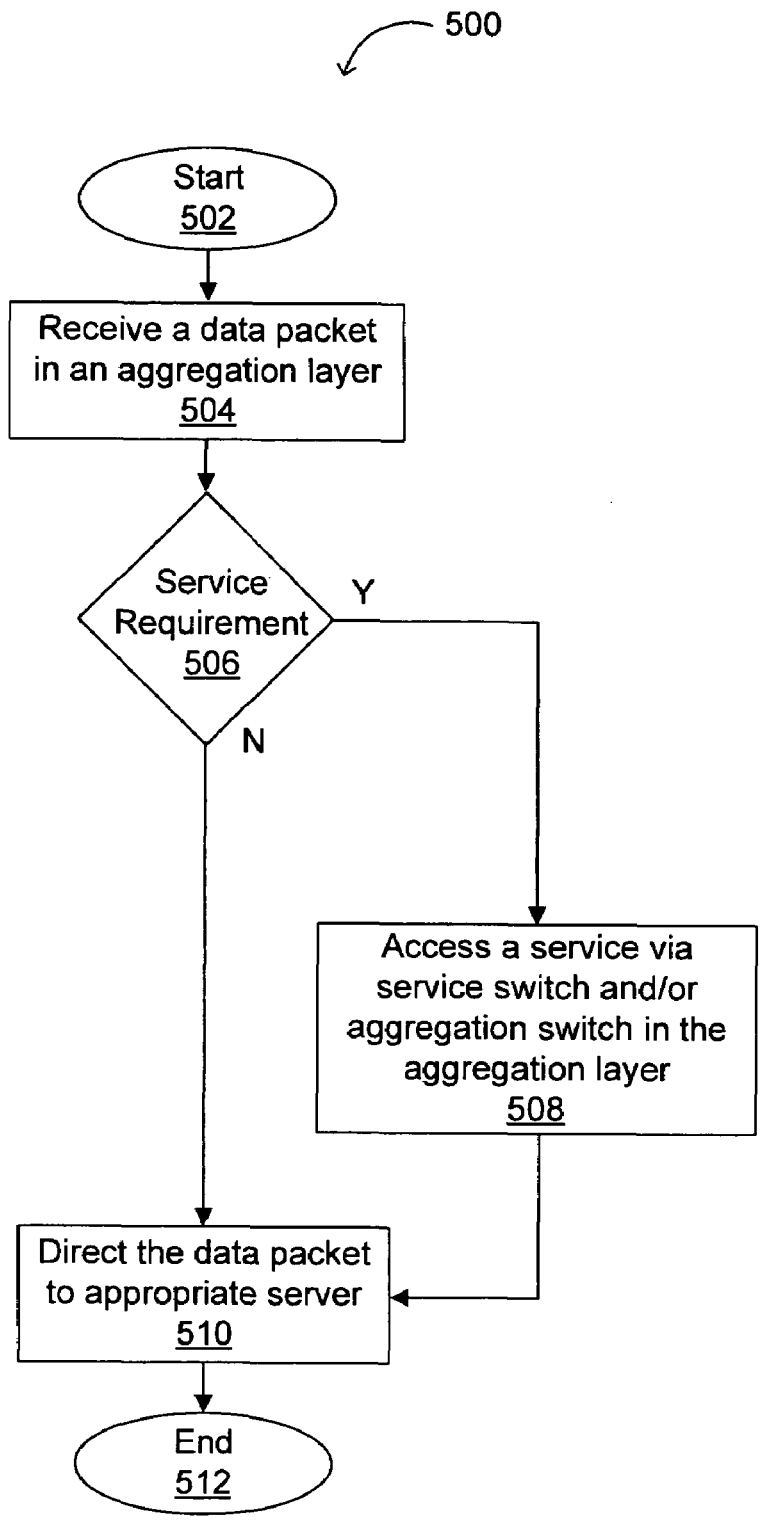
FIG. 5 is a flow diagram of an exemplary method of controlling a service selection for a data packet in accordance with an embodiment of the invention.

Referring now to FIG. 5, a flow diagram of an exemplary method of controlling a service selection for a data packet in accordance with an embodiment of the invention is shown and indicated by the general reference character 500. The flow can start (502) and a data packet can be received in an aggregation layer (504). Next, a determination of whether a service is requested can be made (506). If a service is needed, that service can be accessed via a service switch and/or an aggregation switch in the aggregation layer (508). Once the necessary service has been accessed or if no service has been requested, the data packet can be directed to the appropriate server (510) and the flow can complete (512).

Various embodiments of the present invention include architectures, arrangements, systems, and/or methods for providing service access in a data center. In one embodiment, an arrangement can include: an aggregation switch configured to transfer data between a network and an access layer; and service modules coupled to the aggregation switch, where each service module is configured to provide a service for the data when selected. The service modules can include: firewall, load balancer, secure sockets layer (SSL) offloader, intrusion detection system (IDS), and cache, for example. Further, the service selection can be substantially transparent to an associated server.

Although the invention has been discussed with respect to specific embodiments thereof, these embodiments are merely illustrative, and not restrictive, of the invention. The invention can operate in a variety of systems and server and/or processing arrangements. Any suitable programming language can be used to implement the routines of the invention, including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Further, various architectures and types of circuits, such as switch implementations, can be used in accordance with embodiments.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other electronic device, systems, assemblies, methods, components, materials, parts, and/or the like. In other instances, well-known structures, materials, or operations are not specifically shown or described in detail to avoid obscuring aspects of embodiments of the invention.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An arrangement for service access in a data center, comprising:

an aggregation switch configured to transfer data between a network and an access layer, the aggregation switch comprising a set of slots that allow connections to the aggregation switch;

one or more service switches, each of the one or more service switches connected to a slot in a set of slots of the aggregation switch;

a plurality of servers configured to process data in the data center, each of the plurality of servers coupled to a slot in the set of slots not already occupied by the one or more service switches; and a plurality of service modules coupled to each of the one or more service switches, wherein each of said plurality of service modules is configured to provide a service for said data when selected such that service modules selectively perform services on the data, wherein the selected service modules in the plurality of service modules provide services to the plurality of servers by receiving the data through the service switch from the aggregation switch, processing the data, and sending the processed data through the service switch and the aggregation switch for the plurality of servers while using less than a number of slots on the aggregation switch than a number of the plurality of service modules, wherein the one or more service switches include slots to allow additional service modules to be added for service selection without using additional slots in the aggregation switch.

2. The arrangement of claim 1, further comprising a service switch disposed between said aggregation switch and said plurality of service modules.

3. The arrangement of claim 1, wherein said service selection is substantially transparent to an associated server.

4. The arrangement of claim 1, wherein said plurality of service modules is configured to support a traffic monitoring function.

5. The arrangement of claim 1, wherein said plurality of service modules is configured to support layer 4 to layer 7 functions.

6. The arrangement of claim 1, wherein said plurality of service modules includes a firewall module.

7. The arrangement of claim 1, wherein said plurality of service modules includes a load balancer module.

8. The arrangement of claim 1, wherein said plurality of service modules includes a secure sockets layer (SSL) offloader.

9. The arrangement of claim 1, wherein said plurality of service modules includes an intrusion detection system (IDS) module.

10. The arrangement of claim 1, wherein said plurality of service modules includes a cache module.

11. The apparatus of claim 1, wherein the one or more service switches comprise a layer 4 and/or a layer 7 switch.

12. The apparatus of claim 11, wherein the plurality of service modules provide layer 4 and/or layer 7 services for the plurality of servers.

13. A method for controlling a service selection for a data packet, the method comprising:
receiving a data packet at an aggregation switch in an aggregation layer, the aggregation switch configured to transfer data between a network and an access layer and comprising a set of slots that allow connections to the aggregation switch;
determining whether a service for said data packet is requested;
determining a service switch in one or more service switches, each of the one or more service switches connected to a slot in a set of slots of the aggregation switch when the service is requested;
accessing said service using the determined service switch when requested, wherein each of a plurality of a service modules is configured to provide a service for said data when selected such that service modules selectively perform services on the data, wherein the selected service modules in the plurality of service modules provide services to a plurality of servers by receiving the data through the service switch from the aggregation switch, processing the data, and sending the processed data through the service switch and the aggregation switch for the plurality of servers while using less than a number of slots on the aggregation switch than a number of the plurality of service modules, wherein the one or more service switches include slots to allow additional service modules to be added for service selection without using additional slots in the aggregation switch; and
directing said data packet to an appropriate server in the plurality of servers.

14. The method of claim 13, wherein said service includes one or more of: firewall, load balancing, secure sockets layer (SSL) offloading, intrusion detection system (IDS), and caching.

15. The method of claim 13, wherein accessing said service is substantially transparent to said appropriate server.

16. The method of claim 13, wherein the one or more service switches comprise a layer 4 and/or a layer 7 switch.

17. The method of claim 16, wherein the plurality of service modules provide layer 4 and/or layer 7 services for the plurality of servers.

18. An apparatus comprising:
one or more processors; and
logic encoded in one or more tangible media for execution by the one or more processors and when executed operable to:
receive a data packet at an aggregation switch in an aggregation layer, the aggregation switch configured to transfer data between a network and an access layer and comprising a set of slots that allow connections to the aggregation switch;
determine whether a service for said data packet is requested;
determine a service switch in one or more service switches, each of the one or more service switches connected to a slot in a set of slots of the aggregation switch when the service is requested;
access said service using the determined service switch when requested, wherein each of a plurality of service modules is configured to provide a service for said data when selected such that service modules selectively perform services on the data, wherein the selected service modules in the plurality of service modules provide services to a plurality of servers by receiving the data through the service switch from the aggregation switch, processing the data, and sending the processed data through the service switch and the aggregation switch for the plurality of servers while using less than a number of slots on the aggregation switch than a number of the plurality of service modules, wherein the one or more service switches include slots to allow additional service modules to be added for service selection without using additional slots in the aggregation switch; and
direct said data packet to an appropriate server in the plurality of servers.

* * * * *